(12) United States Patent
Ishii

(10) Patent No.: US 7,017,401 B2
(45) Date of Patent: Mar. 28, 2006

(54) MEASURING DEVICE FOR VOLUME OF ENGINE COMBUSTION CHAMBER

(75) Inventor: Yasushi Ishii, deceased, late of Hamamatsu (JP); by Jun Ishii, legal representative, Hamamatsu (JP)

(73) Assignee: Rion Co., Ltd., Tokyo (JP)

( * ) Notice: Subject to any disclaimer, the term of this patent is extended or adjusted under 35 U.S.C. 154(b) by 24 days.

(21) Appl. No.: 11/037,815

(22) Filed: Jan. 18, 2005

(65) Prior Publication Data

US 2005/0178191 A1  Aug. 18, 2005

(30) Foreign Application Priority Data

Jan. 21, 2004  (JP)  ............... 2004-043626

(51) Int. Cl.
 *G01M 15/00* (2006.01)
(52) U.S. Cl. ...................................... 73/116
(58) Field of Classification Search ................. 73/116, 73/117.2, 117.3, 118.1, 119 R
See application file for complete search history.

(56) References Cited

U.S. PATENT DOCUMENTS

| | | | |
|---|---|---|---|
| 4,430,891 A * | 2/1984 | Holm et al. ............... 73/149 |
| 4,448,065 A * | 5/1984 | Meurer ..................... 73/119 R |
| 4,474,061 A | 10/1984 | Parker |
| 4,561,298 A | 12/1985 | Pond |
| 4,836,015 A * | 6/1989 | Krage ...................... 73/117.2 |
| 4,888,718 A * | 12/1989 | Furuse ...................... 702/50 |
| 5,054,316 A * | 10/1991 | Pratt et al. .................. 731/149 |
| 5,105,825 A | 4/1992 | Dempster |
| 5,824,892 A | 10/1998 | Ishii |

FOREIGN PATENT DOCUMENTS

| | | |
|---|---|---|
| JP | 59-164916 | 9/1984 |
| JP | 05-223616 | 8/1993 |
| JP | 08-029232 | 2/1996 |

* cited by examiner

*Primary Examiner*—Eiric S. McCall

(57) ABSTRACT

A measuring device used in a manufacturing process of an engine, to determine the volume of a complex shaped combustion chamber precisely and quickly in a dry state. A reference chamber is mounted on a combustion chamber of a engine head block which is placed upside down, cyclic volume variation is differentially produced in the internal space of the reference chamber and the internal space of the combustion chamber by a speaker, the ratio of the magnitude of cyclic pressure variations generated within the two spaces is measured, and the difference in volume between the combustion chamber and a standard vessel, having the reference chamber similarly mounted thereto, is obtained based on the ratio of the magnitude of the pressure variations when the reference chamber is mounted on the combustion chamber and the ratio of the magnitude of pressure variations when the reference chamber is mounted on the standard vessel.

10 Claims, 3 Drawing Sheets

MEASURING DEVICE FOR VOLUME OF ENGINE COMBUSTION CHAMBER

BACKGROUND OF THE INVENTION

1. Field of the Invention

The present invention relates to a measuring device which precisely measures the difference in volume between a complex shaped combustion chamber and a standard vessel in a dry state by means of cyclic pressure variation of gas in a manufacturing process of an engine.

2. Description of the Prior Art

The volume of an engine combustion chamber for a vehicle or the like needs to be controlled because it affects the engine performance or the knocking properties. However, since the engine combustion chamber has a complex shape in which valves, ignition plug, or the like are projected, it is very difficult to calculate the volume by measuring the size.

In a manufacturing process of an engine, an engine head block in which a combustion chamber is installed is transferred by a belt conveyer in a state where the combustion chamber faces upward by turning the engine head block. In order to measure the volume of the combustion chamber in this state, a method has been conventionally employed in which a transparent acrylic plate or the like having a small hole in the center is placed on the top of the combustion chamber, liquid is dropped from a buret to the hole until the combustion chamber is filled with the liquid, and the volume of the combustion chamber is obtained by measuring the volume of the dropped liquid. However, this method has drawbacks, for example, in that it needs a long period of time and also the liquid has to be removed after the measurement.

On the other hand, as a method for measuring the volume of a complex shaped object in a dry state, there has been known a method in which the object is placed in a container, cyclic volume variation is produced in the internal space of the container by using a sound source such as a speaker so as to adiabatically compress and expand gas within the container, and the volume of the object is obtained from the magnitude of cyclic pressure variation irrespective of the shape of the object.

As a measuring instrument of this type, Parker (U.S. Pat. No. 4,474,061 (1984)) discloses a device which measures the amount of fuel in a tank. In Japanese Pre-grant Patent Publication No. 2-33,084 (1990), the inventor of the present application has proposed an acoustic volumeter which differentially produces cyclic volume variation in both a reference chamber and a measuring chamber, and measures the volume of the free space within the measuring container based on the ratio of the magnitude of gas pressure variation between these chambers, i.e. the ratio of the magnitude of sound pressure generated at that time, so as to obtain the volume of an object placed within the measuring chamber. Pond (U.S. Pat. No. 4,561,298 (1985)) discloses a device that measures the volume of the free space within a container using a similar method. Further, in Japanese Patent Application Publication No. 5-223,616 (1993), the inventor of the present application has proposed an acoustic volumeter which is not influenced by changes in the constituents of gas such as humidity in the air by means of an equalizing pipe provided between the reference chamber and the measuring chamber. Dempster (U.S. Pat. No. 5,105,825 (1992)) discloses a device which measures the volume of a human body by using an acoustical method, calculates the density of the human body from the measured volume and the weight of the human body, and then obtains the percent of body fat. The object of these inventions is to measure the volume of fuel or an object placed in a container. In contrast, the object of the present invention is to measure the volume of a container itself, i.e., an engine combustion chamber.

In Japanese Patent Application Publication No. 8-29232 (1996) which has been issued as Japanese Patent No. 3,525,502 (2004), the inventor of the present application has proposed an acoustic volumeter which measures the total volume of an engine combustion chamber and a cylinder by feeding sound thereinto through a connecting pipe coupled to a plug hole of an assembled engine. Since the volume is directly measured from the magnitude of the sound pressure and the influence of the acoustic impedance of the connecting pipe is included in this device different from the present invention, the measuring equation of this device is totally different from that of the present invention which measures volume difference between the combustion chamber and the standard vessel.

In U.S. Pat. No. 5,824,892 (1998), the inventor of the present invention has proposed an acoustic volumeter in which cyclic volume variation is differentially produced in a reference container and a measuring container by using a speaker, and the ratio of the magnitude of sound pressure between these containers are detected, so as to measure the volume difference between an object placed in the measuring container such as a precision weight and a standard object to be compared. This invention is referred to as the conventional invention hereinafter.

In the conventional invention, if the volume of the standard object to be compared is known, the volume of the object to be measured can be known by adding the measured volume difference to the volume of the standard object. However, in the case of a combustion chamber, the volume of the chamber itself is to be measured rather than the volume of an object placed therein. Therefore, in order to use the magnitude of sound pressure as shown in the conventional invention, since the conventional invention cannot be directly applied, it is necessary to introduce a new device which has a different structure and measuring method from the conventional invention.

SUMMARY OF THE INVENTION

In order to solve the above-mentioned problems, according to the present invention, there is provided a device comprising a reference chamber, a sound source such as a speaker which is set to differentially produce cyclic volume variation in the internal space of the reference chamber and the internal space of a combustion chamber in a state where the reference chamber is mounted on the combustion chamber of a engine head block which is placed upside down, pressure variation detectors such as microphones for detecting cyclic pressure variations within the spaces respectively which are generated by providing the cyclic volume variation, a means for measuring the ratio of the magnitude of the detected pressure variations, and a means for obtaining the difference in volume between the combustion chamber and a standard vessel based on the ratio of the magnitude of the pressure variations when the reference chamber is mounted on the combustion chamber and the ratio of the magnitude of pressure variations when the reference chamber is mounted on the standard vessel.

In the device according to the present invention, since the shapes of the standard vessel and the combustion chamber do not affect the measurement, it is not necessary to make the shape of the vessel the same as that of the combustion chamber. For example, by employing a standard vessel obtained by processing the upper surface of a metal block to be a flat surface and providing a cylindrical recessed portion in the processed surface, it is possible to easily obtain the volume thereof by measuring the size. Accordingly, when the difference in volume between the combustion chamber and the standard vessel is measured in the device according to the present invention, the volume of the combustion chamber can be calculated by adding the volume of the standard vessel which is obtained as mentioned above to the difference in volume. However, in an actual process for manufacturing an engine, the absolute value of the volume of the combustion chamber is not always required, and there are many cases where the difference in volume between the combustion chamber and the standard vessel is sufficient.

DETAILED DESCRIPTION OF THE PREFERRED EMBODIMENTS

Hereinafter, the details of the present invention will be described with reference to the preferred embodiments.

Figure 1:
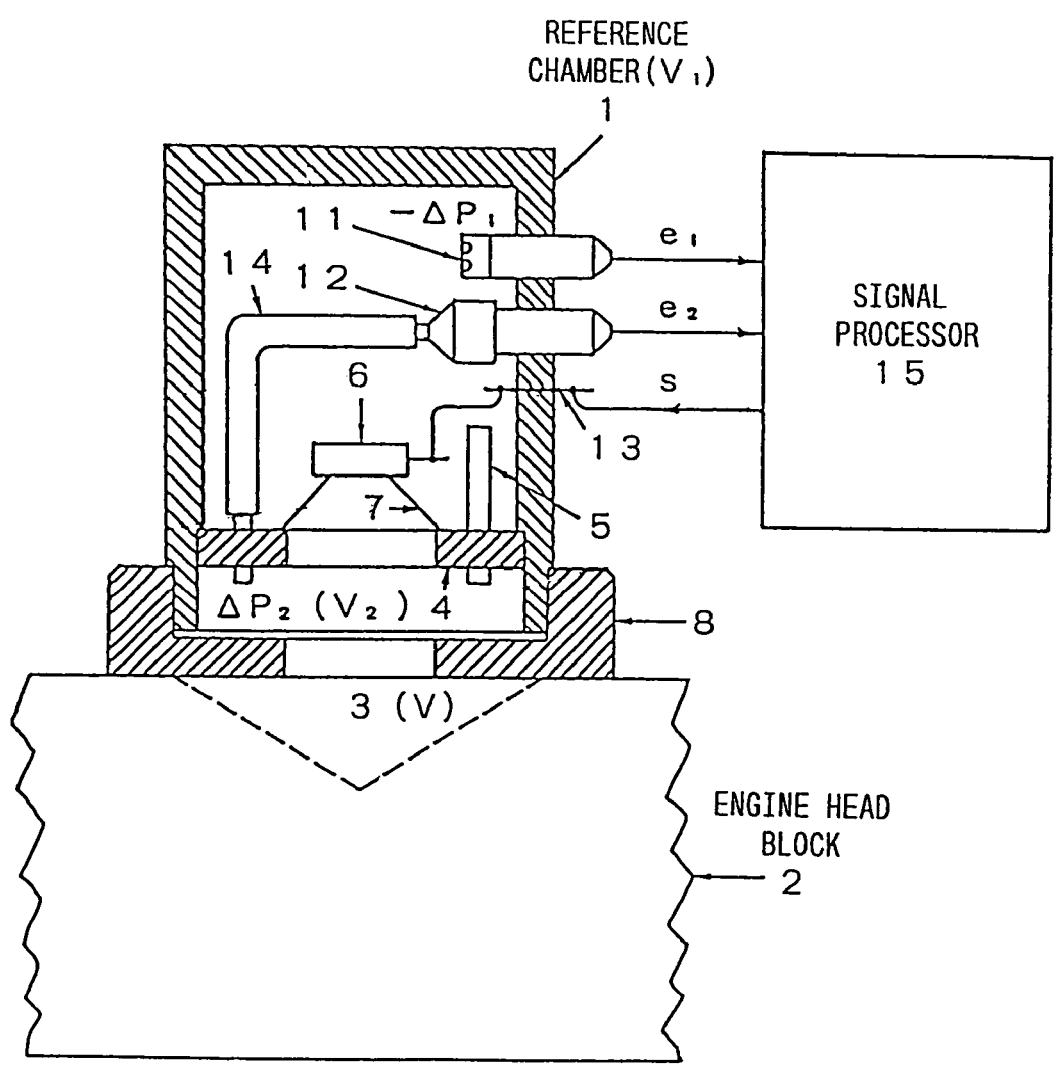
FIG. 1 shows a measuring device according to the present invention.

In FIG. 1, reference number 1 is a reference chamber whose internal space has a volume of "$V_1$", reference number 2 is an engine head block which is placed upside down, and reference number 3 is a combustion chamber having a volume of "V". An adapter 8 is attached to the lower portion of the reference chamber 1, and the reference chamber 1 is mounted on the combustion chamber 3 in this state. In this instance, the lower surface of the adapter 8 and the upper surface of the engine head block 2 are in contact with each other, so that the internal space of the combustion chamber 3 is sealed acoustically. However, the adapter 8 is not essential because there are cases where sufficient acoustic sealing can be achieved even if the reference chamber 1 is directly mounted on the combustion chamber without the adapter.

A speaker 6 is attached to a separator 4 of the reference chamber 1. When a cyclic driving signal "s" is supplied to the speaker 6 via a terminal 13, a vibrating plate 7 having a cone shape of the speaker is allowed to vibrate, and small volume variation is differentially produced in the internal spaces of the reference chamber 1 and the combustion chamber 3. Pressure variation within the reference chamber 1 which is generated thereby is detected by a microphone 11, and the output signal thereof "$e_1$" is captured by a signal processor 15. On the other hand, pressure variation within the combustion chamber 3 is introduced to and detected by another microphone 12 via a flexible tube 14, and the output signal thereof "$e_2$" is also captured by the signal processor 15. An equalizing pipe 5 has a function of equalizing the static pressure within the reference chamber 1 and the combustion chamber 3. However, the static pressure within the combustion chamber 3 is atmospheric pressure, and the static pressure within the reference chamber 1 is also kept atmospheric pressure because the inside of the reference chamber 1 leads to the combustion chamber 3 via gaps in the paper of the cone plate 7. Therefore, the equalizing pipe 5 is not essential. Incidentally, "$V_2$" refers to the total volume of the space under the separator 4 and the space of the combustion chamber 3 having a volume of "V" which leads thereto.

Figure 2:
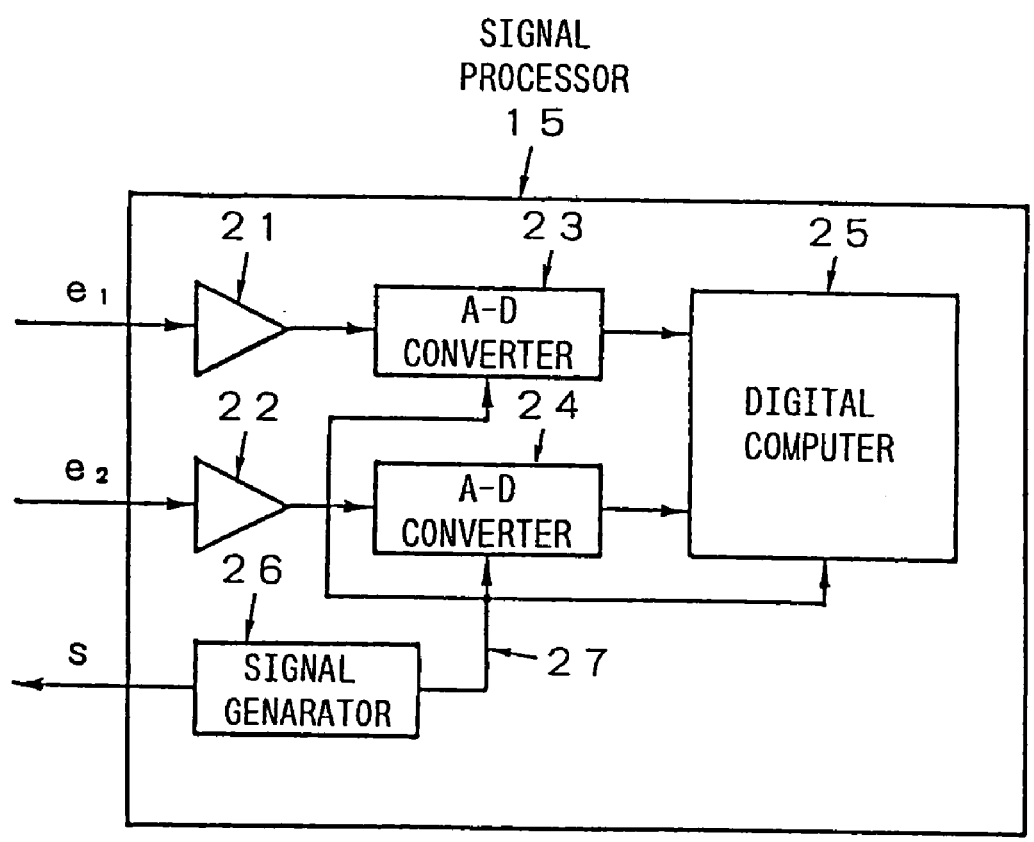
FIG. 2 shows an example of a signal processor used in the present invention.

FIG. 2 shows an example of the signal processor 15. The output signals "$e_1$" and "$e_2$" of the microphones 11 and 12 are amplified by amplifiers 21 and 22, converted into a digital amount by analog-to-digital converters 23 and 24, and captured by a digital computer 25. Reference number 26 is a signal generator which generates a cyclic speaker-driving signal "s" to be supplied to the speaker 6, and also generates synchronizing pulses to be supplied to the analog-to-digital converters 23, 24 and the digital computer 25 via a lead wire 27. The analog-to-digital converting process and the capturing process by the digital computer mentioned above are conducted in a state of being synchronized with the synchronizing pulses.

In operation, when the speaker 6 is driven by the speaker-driving signal "s", supposing the vibrating plate 7 is pushed so as to compress the total volume "$V_2$" by a small volume "$\Delta V_S$", the volume "$V_1$" of the internal space of the reference chamber 1 is expanded by the volume of "$\Delta V_S$". Also, supposing gas having a small volume of "$\Delta V_P$" is flowed into the space under the separator 4 through the equalizing pipe 5, gas having the volume of "$\Delta V_P$" is flowed out of the reference chamber 1 through the equalizing pipe 5. In this case, small pressure variations are generated in the internal space of the reference chamber 1 and the space under the separator 4, respectively. When the pressure variations are represented by "$-\Delta P_1$" and "$\Delta P_2$", respectively, and equation 1 is used, $$\Delta V = \Delta V_S + \Delta V_P \qquad \text{equation 1}$$

equations 2 and 3 are introduced by the relation of adiabatic change of gas, $$\Delta P_1/P_0 = \gamma \Delta V/V_1 \qquad \text{equation 2}$$

$$\Delta P_2/P_0 = \gamma \Delta V/V_2 \qquad \text{equation 3}$$

wherein $P_0$ refers to the average static pressure of gas, generally air, within the reference chamber 1 and the space under the separator 4, and γ (gamma) refers to the specific heat ratio of the gas, which is about 1.4 with respect to air. From equations 2 and 3, $$\Delta P_1/\Delta P_2 = V_2/V_1 \qquad \text{equation 4}$$

or $$V_2 = V_1 \Delta P_1/\Delta P_2 \qquad \text{equation 5}$$

is obtained. Since "$V_1$" is a constant value, the volume "$V_2$" has a linear relation to the ratio of the magnitude of the pressure variation "$\Delta P_1/\Delta P_2$". Also, since the volume "$V_2$" is obtained by adding the volume within the adapter 8 to the volume "V" of the combustion chamber 3, the volume "V" of the combustion chamber is also a linear relation to "$\Delta P_1/\Delta P_2$".

If the cyclic signal "s" for driving the speaker 6 is a sine wave signal having a frequency of "f", the output signals "$e_1$" and "$e_2$" of the microphones 11 and 12 are also a sine wave signal. The digital computer 25 captures a certain number of sampling points of these signals, and conducts a Fourier transform to the captured data so as to precisely measure the amplitude "$E_1$" and "$E_2$" of "$e_1$" and "$e_2$". The ratio of the pressure variation "$\Delta P_1/\Delta P_2$" is represented by using the following ratio "R" of the amplitude "$E_1$" and "$E_2$":

$$R=E_1/E_2 \quad \text{equation 6}$$

As mentioned above, the device according to the present invention is for measuring the difference between the volume "V" of the combustion chamber and the volume of the standard vessel. Specifically, when the volume of the standard vessel is represented by "$V_{S1}$", the following "$V_D$" is obtained from the above ratio "R" of the amplitude:

$$V_D=V-V_{S1} \quad \text{equation 7}$$

by using the measuring equation as follows:

$$V_D=k(R-R_0) \quad \text{equation 8}$$

wherein "k" is a constant which represents the gradient of this first order equation, and "$R_0$" is a value of "R" at the time of mounting the reference chamber on the standard vessel, which is also a constant. In the computer 25, the difference in volume $V_D$ is calculated from the value of "R" at the time of mounting the reference chamber on the combustion chamber based on equation 8.

Figure 3:
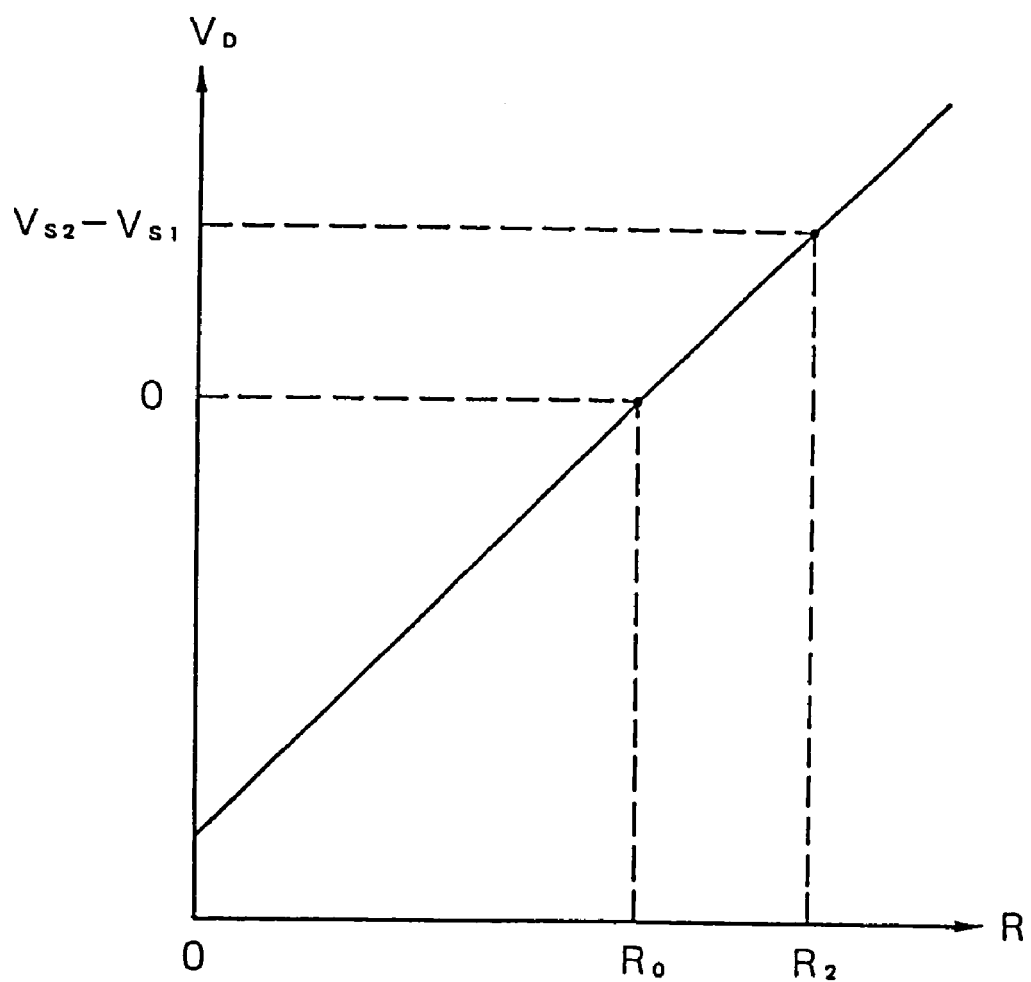
FIG. 3 is a graph of a measuring equation according to the present invention.

FIG. 3 shows the graph of equation 8. The coefficient "k" and "$R_0$" of this equation are determined by calibration. Specifically, the ratio "$R_0$" of the amplitude is measured by mounting the reference chamber on the standard vessel, "$V_D$" is set 0, and the point of origin ($R_0$, 0) is determined. Next, the ratio "$R_2$" of the amplitude is measured by mounting the reference chamber on a second standard vessel having a volume of "$V_{S2}$". In this instance, the volume difference is "$V_{S2}-V_{S1}$", and thereby the point ($R_2$, $V_{S2}-V_{S1}$) is determined. These two points are connected by a line, and thereby the gradient coefficient "k" is determined. By storing the value of the volume "$V_{S1}$" of the standard vessel, which is used in the above-mentioned calibration, in the computer, the following operation is conducted so as to obtain the volume "V" of the combustion chamber from the volume difference "$V_D$".

$$V=V_D+V_{S1} \quad \text{equation 9}$$

In a manufacturing line of a factory, a great number of engines of the same kind are manufactured, which have a combustion chamber of almost the same volume. Therefore, in a case where the volume of the combustion chamber is measured sequentially, it is possible to make use of the advantage of the present invention that the volume difference is measured. Specifically, if a standard vessel having a similar volume to the combustion chamber is used, the range used for the measurement is limited to the neighborhood of the point of origin ($R_0$, 0) in FIG. 3. Since the volume "V" of the combustion chamber is obtained by adding the volume "$V_{S1}$" of the standard vessel to the measured difference "$V_D$" which is small, even if the gradient of the graph is displaced from the correct value, it hardly ever affects the measured value of the volume "V" of the combustion chamber. For example, supposing the volume of the combustion chamber to be measured is within the range of ±10% of the volume "$V_{S1}$" of the standard vessel, even if error of 1% is generated in the gradient coefficient "k" of equation 8 stored in the computer 25 so as to generate an error of 1% in the measured value of the volume difference "$V_D$", an error of only 0.1% is generated in the measured value of the volume "V" of the combustion chamber which is finally obtained.

If there is sensitivity change in a microphone, error is generated in the value of the amplitude ratio "$R_0$" in the point of origin. This also leads to error in the measured value of the volume difference "$V_D$". In order to correct this error, zero adjustment is conducted in which the amplitude ratio "$R_0$" is measured in a state where the reference chamber 1 is mounted on the standard vessel having a volume of "$V_{S1}$", and "$R_0$" of the measuring equation stored in the computer is reset by using the measured value. However, it is hardly required to conduct calibration operation for resetting the gradient coefficient "k" by using a second standard vessel for the above-mentioned reason. It is usually sufficient to conduct calibration only once prior to a series of measurement steps, and by conducting zero adjustment on demand between the measurement steps, the accuracy of measurement can be achieved.

In the method according to the present invention, the volume difference is measured, and the volume of the combustion chamber is obtained by adding the volume of the standard vessel to the volume difference if needed. In contrast, although a first order measuring equation can be made so as to obtain the volume "V" of the combustion chamber directly from the amplitude ratio "R", the point of origin in this case is V=0, and the range used for the measurement in the graph of the measuring equation is remote from the point of origin. Therefore, both of error in the point of origin and error in the gradient coefficient due to sensitivity change in a microphone affects the measured value of the volume "V" of the combustion chamber and causes error. As a result of this, it becomes necessary to conduct laborious calibration repeatedly in a series of measurement steps.

As described above, according to the present invention, the volume of the engine combustion chamber can be detected in a dry state without using liquid. Since the required time is several seconds or less per chamber, the efficiency of manufacturing an engine can be greatly improved.

What is claimed is:

1. A measuring device for a volume of an engine combustion chamber comprising:
    a reference chamber;
    a means for differentially producing cyclic volume variation in the internal space of the reference chamber and the internal space of a combustion chamber in a state where the reference chamber is mounted on the combustion chamber of an engine head block;
    a means for detecting cyclic pressure variations within the spaces of the reference chamber and the combustion chamber;
    a means for measuring a ratio of the magnitude of the detected pressure variations; and
    a means for obtaining a difference in volume between the combustion chamber and a standard vessel based on the ratio of the magnitude of the pressure variations when the reference chamber is mounted on the combustion chamber and the ratio of the magnitude of pressure variations when the reference chamber is mounted on the standard vessel.

2. The measuring device according to claim 1, wherein a loudspeaker is the means for differentially producing cyclic volume variation in the internal space of the reference chamber and the internal space of a combustion chamber in a state where the reference chamber is mounted on the combustion chamber of the engine head block.

3. The measuring device according to claim 1, wherein microphones are the means for detecting cyclic pressure variations within the internal space of the reference chamber and the internal space of a combustion chamber respectively.

4. The measuring device according to claim 1, wherein a digital computer is the means for measuring the ratio of the magnitude of the detected pressure variations.

5. The measuring device according to claim 1, wherein a digital computer is the means for obtaining the difference in volume between the combustion chamber and a standard vessel based on the ratio of the magnitude of the pressure variations when the reference chamber is mounted on the combustion chamber and the ratio of the magnitude of pressure variations when the reference chamber is mounted on the standard vessel.

6. A measuring device for a volume of an engine combustion chamber comprising:
   a reference chamber;
   a means for differentially producing cyclic volume variation in the internal space of the reference chamber and the internal space of a combustion chamber in a state where the reference chamber is mounted on the combustion chamber of an engine head block;
   a means for detecting cyclic pressure variations within the spaces of the reference chamber and the combustion chamber;
   a means for measuring a ratio of the magnitude of the detected pressure variations; and
   a means for obtaining a difference in volume between the combustion chamber and a standard vessel based on the ratio of the magnitude of the pressure variations when the reference chamber is mounted on the combustion chamber and the ratio of the magnitude of pressure variations when the reference chamber is mounted on the standard vessel, and obtaining the volume of the combustion chamber by adding the volume of the standard vessel to the difference in volume.

7. The measuring device according to claim 6, wherein a digital computer is the means for obtaining the difference in volume between the combustion chamber and a standard vessel based on the ratio of the magnitude of the pressure variations when the reference chamber is mounted on the combustion chamber and the ratio of the magnitude of pressure variations when the reference chamber is mounted on the standard vessel, and obtaining the volume of the combustion chamber by adding the volume of the standard vessel to the difference in volume.

8. The measuring device according to claim 6, wherein the means for differentially producing cyclic volume variation in the internal space of the reference chamber and the internal space of a combustion chamber comprises a loudspeaker in a state where the reference chamber is mounted on the combustion chamber of the engine head block.

9. The measuring device according to claim 6, wherein the means for detecting cyclic pressure variations within the internal space of the reference chamber and the internal space of a combustion chamber, respectively, comprises microphones.

10. The measuring device according to claim 6, wherein the means for measuring the ratio of the magnitude of the detected pressure variations comprises a digital computer.

* * * * *

UNITED STATES PATENT AND TRADEMARK OFFICE
CERTIFICATE OF CORRECTION

| | |
|---|---|
| PATENT NO. | : 7,017,401 B2 |
| APPLICATION NO. | : 11/037815 |
| DATED | : June 6, 2006 |
| INVENTOR(S) | : Ishii |

It is certified that error appears in the above-identified patent and that said Letters Patent is hereby corrected as shown below:

Title page:
   Under "References Cited", section (56), further under "U.S. PATENT DOCUMENTS", for reference number 5,054,316, change "731/149" to --73/149--.
   After *"Primary Examiner ---"*, change "Eiric" to --Eric--.
   Below the *"Primary Examiner ---"* line, add the following section:   --*Attorney, Agent, or Firm* ---Carrier, Blackman & Associates, P.C.; Joseph P. Carrier; William D. Blackman--.
   In the "ABSTRACT", section (57),
      2nd line, change "complex shaped" to --complex-shaped--;
      5th line, change "a engine" to --an engine--; change "upside down" to --upside-down--.

In the drawings:
   Sheet 2 of 3, FIG. 2, in box 26, change "GENARATOR" to --GENERATOR--.

Column 1:
   Line 9, change "complex shaped" to --complex-shaped--.
   Line 36, change "complex shaped" to --complex-shaped--.

Column 2:
   Line 52, change "of a engine" to --of an engine--.

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,017,401 B2  Page 1 of 1
APPLICATION NO. : 11/037815
DATED : March 28, 2006
INVENTOR(S) : Ishii It is certified that error appears in the above-identified patent and that said Letters Patent is hereby corrected as shown below:

Title page:
Under "References Cited", section (56), further under "U.S. PATENT DOCUMENTS", for reference number 5,054,316, change "731/149" to --73/149--.
After *"Primary Examiner ---"*, change "Eiric" to --Eric--.
Below the *"Primary Examiner ---"* line, add the following section: --*Attorney, Agent, or Firm* ---Carrier, Blackman & Associates, P.C.; Joseph P. Carrier; William D. Blackman--.
In the "ABSTRACT", section (57),
    2nd line, change "complex shaped" to --complex-shaped--;
    5th line, change "a engine" to --an engine--; change "upside down" to --upside-down--.

In the drawings:
Sheet 2 of 3, FIG. 2, in box 26, change "GENARATOR" to --GENERATOR--.

Column 1:
Line 9, change "complex shaped" to --complex-shaped--.
Line 36, change "complex shaped" to --complex-shaped--.

Column 2:
Line 52, change "of a engine" to --of an engine--.

This certificate supersedes Certificate of Correction issued August 8, 2006.

Signed and Sealed this

Fifth Day of September, 2006

JON W. DUDAS
*Director of the United States Patent and Trademark Office*